(12) United States Patent
Yang et al.

(10) Patent No.: US 12,518,652 B2
(45) Date of Patent: Jan. 6, 2026

(54) BRAILLE MODULE AND DOT-MATRIX TACTILE DISPLAY TERMINAL

(71) Applicant: Hangzhou Interactive Perception Technology Co., Ltd, Hangzhou (CN)

(72) Inventors: Wenzhen Yang, Hangzhou (CN); Wentao Tao, Hangzhou (CN); Chang Liu, Hangzhou (CN); Hongbo Liang, Hangzhou (CN); Feifan Wang, Hangzhou (CN)

(73) Assignee: Hangzhou Interactive Perception Technology Co., Ltd, Hangzhou (CN)

( * ) Notice: Subject to any disclaimer, the term of this patent is extended or adjusted under 35 U.S.C. 154(b) by 484 days.

(21) Appl. No.: 18/302,895

(22) Filed: Apr. 19, 2023

(65) Prior Publication Data
US 2024/0304110 A1   Sep. 12, 2024

(30) Foreign Application Priority Data

Mar. 7, 2023   (CN) .......................... 202310240004.6

(51) Int. Cl.
*G09B 21/00*   (2006.01)
(52) U.S. Cl.
CPC ................. *G09B 21/004* (2013.01)

(58) Field of Classification Search
CPC ..................................................... G09B 21/004
See application file for complete search history.

(56) References Cited

U.S. PATENT DOCUMENTS

| | | | |
|---|---|---|---|
| 2011/0216006 A1* | 9/2011 | Litschel | G09B 21/02 345/168 |
| 2017/0076633 A1* | 3/2017 | Moon | G09B 21/004 |
| 2020/0160747 A1* | 5/2020 | Yang | G09F 9/377 |
| 2021/0286441 A1* | 9/2021 | Litschel | G09B 21/04 |
| 2021/0287569 A1* | 9/2021 | Moon | G09B 21/004 |
| 2021/0295739 A1* | 9/2021 | Moon | G06F 3/02 |

* cited by examiner

*Primary Examiner* — Eddy Saint-Vil
(74) *Attorney, Agent, or Firm* — Ladas & Parry LLP

(57) ABSTRACT

The present application discloses a Braille module and a dot-matrix tactile display terminal, and the application relates to the technical field of tactile display. The Braille module includes a touch pad module, Braille dot driver modules, magnetic conductive plates, an enclosure panel, a bottom plate, a bottom plate accessory and a needle stand connector module. The touch pad module is provided with eight-dot array Braille dots. By adopting a modularized design scheme, the dot-matrix tactile display terminal of the present application has a wide range applications and has the technical advantages in assemblability, maintainability and processability, which are beneficial in manufacturing various types of Braille dot displays and two-dimensional touch image display devices with relatively low costs.

10 Claims, 9 Drawing Sheets

BRAILLE MODULE AND DOT-MATRIX TACTILE DISPLAY TERMINAL

CROSS REFERENCE TO RELATED APPLICATION

This application claims priority to Chinese Patent Application No. 202310240004.6, filed on Mar. 7, 2023, which is incorporated by reference in its entirety.

FIELD OF TECHNOLOGY

The present application relates to the technical field of tactile display, and particularly relates to a Braille module and a dot-matrix tactile display terminal.

BACKGROUND

There are a huge number of visually impaired people in the world, about 0.285 billion, 39 million of whom lose their sight completely. In our digital era, the dot-matrix tactile display terminals can help visually impaired people acquire acknowledge without barriers and integrate into the information society.

In the prior art, Kwon et al. in South Korea have developed a phase change material type dot-matrix tactile display terminal by applying a polydimethylsiloxane film and a phase material, with problems of high driving voltage and long response time. Matsunaga et al. in Japan have developed a dot-matrix tactile display terminal with 100 Braille dots and the dot pitch of 2.5 mm by combining an SMA micro coil driver with a permanent magnet self-locking structure, with the problem of lower refresh rate of Braille dots. Xie et al. in the US have developed a piezoelectric ceramics dot-matrix tactile display terminal by applying a micro "scissor" mechanism, which cannot meet the requirements on dot pitch of Braille. Russomanno et al. in the US have developed a pneumatic type tactile display terminal with 56 Braille dots and the dot pitch of 2.5 mm, with the problem of high energy consumption and inconvenience to carry. Juan et al. in Switzerland have developed an electromagnetic tactile display terminal with 16 Braille dots and the dot pitch of 4 mm, with the problem of relatively small support forces of Braille dots. Therefore, existing dot-matrix tactile display terminals have the problems of low refresh rate, small support forces, and large dot pitch of Braille dots, inconvenience to be carried, and cannot meet the requirements of the visually impaired people to acquire acknowledge without barriers.

SUMMARY

In order to solve the problems in the background art, the objective of the present application is to provide a Braille module and a dot-matrix tactile display terminal for digitally and dynamically presenting single-row or multi-rows of Braille and dot-matrix touch images. The Braille module and the dot-matrix tactile display terminal feature high response speed of dots, large support force, low power consumption, small size and light weight, have the technical creativity, leadership and applicability, and can help the visually impaired people acquire acknowledge without barriers.

In order to achieve the above objective, the present application is achieved by the technical solution as follows: a Braille module includes a touch pad module, Braille dot driver modules, magnetic conductive plates, an enclosure panel, a bottom plate, a bottom plate accessory and a needle stand connector module, wherein the touch pad module is provided with eight-dot array Braille dots arranged in two rows and four columns, and each of the Braille dots is controlled by one Braille dot driver module.

Preferably, both sides of the touch pad module are provided with two buckles, and the two buckles and two chutes in the enclosure panel are in clearance fit; a lower bottom surface of the touch pad module contacts with a positioning plate platform on the enclosure panel; a positioning hole of the touch pad module is in a reversed trumpet shape for positioning an upper iron core in the Braille dot driver module; the magnetic conductive plates are arranged in three grooved magnetic conductive plate grooves of the enclosure panel and are made from an iron base amorphous alloy; the bottom of the enclosure panel is provided with two bottom plate slots, and the enclosure panel and two enclosure panel slots of the bottom plate are in clearance fit for mounting the enclosure panel on the bottom plate; the bottom plate is provided with sixteen pin column holes for clearance fit with pin columns of the Braille dot driver module for fixing the Braille dot driver module; the bottom plate accessory is provided with two connecting columns for transition fit with bottom plate accessory connecting holes of the bottom plate; and a lower part of the bottom plate accessory is provided with the needle stand connector, the needle stand connector is provided with a lead pin locking base for transition fit with a lead pin of the lead pin locking base of the Braille dot driver module.

Preferably, the touch pad module includes a touch pad, Braille touch dots and a positioning plate, wherein the bottom of the touch pad is provided with five positioning plate connecting holes for transition fit with five connecting columns of the positioning plate; the diameter of eight holes above the positioning plate is smaller than that of the lower end of each Braille touch dot; a cavity is formed between a step hole of the touch pad and an upper top surface of the positioning plate for providing a moving space for the Braille touch dots to move up and down; and the touch pad and the positioning plate are made from nylon and are injection-molded by a precise mold; and the Braille touch dots are made from an aluminum alloy.

Preferably, the Braille dot driver module includes an upper iron core, a drive needle, a coil, a framework, a permanent magnet and a lead pin of a lead pin locking base; the permanent magnet is arranged at the bottom of the step hole of the framework; the upper iron core is provided with a through hole, is mounted in the step hole of the framework for clearance fit, and is adhered and attached to a top surface of the framework, the upper iron core is made from a soft magnetic material, with a TD4C model, and the size of a cone-shaped head of the upper iron core is smaller than that of the positioning hole of the positioning hole; the drive needle is inserted into the through hole of the upper iron core, and a lower end surface of the drive needle tightly contacts with a top surface of the permanent magnet; the coil is wound by a 80-micron enameled wire and is arranged on a wrapping post of the framework, and a coil-in and a coil-out of the coil bypass two lead grooves of the framework and are welded with two lead pins; the framework is made from glass fiber enhanced nylon and is injection-molded by the precision mold, and two lead pins of the lead pin locking base are inserted onto two pin columns thereof, the lead pins of the lead pin locking base are made from iron or copper; after the upper ends of the lead pins of the lead pin locking base are roughened, they are inserted onto two pin columns of the framework; and the lower ends of the lead pins are inserted into the lead pin locking base of the bottom plate accessory. After a reverse current is applied to the lead pins of the lead pin locking base of the Braille dot driver module, under the joint action of the coil and the upper iron core, a forward magnetic field and a reverse magnetic field are generated to drive the permanent magnet to move upwards or downwards; when the permanent magnet moves upwards, it drives the drive needle to move upwards, and when the permanent magnet clings to the bottom surface of the upper iron core, the drive needle is at an upper dead point; when the permanent magnet moves downwards, the drive needle moves downwards dependent on its own gravity. When the permanent magnet contacts with the step plane of the step hole in the framework, the drive needle is at a lower dead point.

Preferably, the enclosure panel is concave, is made from nylon and is injection-molded by the precision mold; tops on both sides of the enclosure panel are provided with two chutes with bevels; and two lower sides of the chutes protrude inwards to form the positioning plate platform; the touch pad module is fixed by the chutes and the positioning plate platform; the bottom of the positioning plate platform is provided with three pairs of magnetic conductive plate grooves for placing the magnetic conductive plates; and the enclosure panel is provided with four positioning columns for transition fit with an assembly slot in a base, and the bottom of the enclosure panel is provided with two bottom plate slots for being connected to an enclosure panel slot of the bottom plate.

Preferably, the bottom plate is made from the soft magnetic material with DT4C model, the bottom plate is provided with circular groove type enclosure panel slots and pin column holes for mounting eight Braille dot driver modules; the eight Braille dot driver module are mounted on the bottom plate, and a bottom surface of a square platform of the framework contacts with a top surface of the bottom plate for fixing the framework; and when the permanent magnet contacts with the step plane of the step hole in the framework, it can be attracted by the bottom plate below the framework under the magnetic action.

Preferably, the bottom plate accessory is cuboid-shaped, is made from nylon and is injection-molded by the precise mold; and there are two cylindrical columns at the top left corner and the bottom right corner for being connected to the bottom plate; the bottom plate accessory is internally provided with eight groups of sixteen trumpet-shaped through holes, and arrangement sizes of the through holes are identical to those of the bottom plate and the needle stand connector module; and the bottom plate accessory is configured to guide the lead pins of the Braille dot driver module to the lead pin locking base of the needle stand connector module.

Preferably, the needle stand connector module includes a connector base, the lead pin locking base, a flexible flat cable and a male connector of the connector; the connector base is provided with eight groups of diagonally distributed step holes for clearance fit with the lead pin locking base; and one end of the flexible flat cable is welded with the lead pin locking base and the other end thereof is connected to the male connector of the connector.

A dot-matrix tactile display terminal includes several Braille modules and a base, wherein the Braille module is the Braille module according to any one of claims 1-8; the Braille module is provided with a positioning column, and the positioning column and an assembly slot on the base are in transition fit, so that the Braille module is stably connected to the base; and the dot-matrix tactile display terminal is configured to digitally and dynamically present single-row or multi-rows of Braille and dot-matrix touch images.

Preferably, the base is of a cuboid frame structure, and thin bosses at both ends of the base are provided with connecting holes; four positioning bosses are uniformly arranged in front of the base, four positioning grooves are uniformly formed behind the base, and the positioning bosses and the positioning grooves are adaptive for positioning a plurality of bases expanded in parallel; and an inner wall of each base is provided with several groups of assembly slots for fixing the Braille modules.

Compared with the prior art, embodiments of the present application has the following advantages:

(1) the present application has the technical characteristic of expandability, can be applied to a single-party Braille dot display, a single-row Braille dot display, a multi-row Braille dot display and a two-dimensional touch image display device, is wide in application range, and can be applied to various electronic Braille application scenarios;

(2) by adopting a modularized design method, the present application has the technical features of assimilability, maintainability and processability. A plurality of bases can be precisely matched and interconnected through the Braille module and a mechanical structure of the base, and various types of Braille dot displays and two-dimensional touch image display devices can be manufactured with relatively low costs; and (3) by adopting a Braille touch dot close-packed lattice individual driving technology, the present application features short response time, high refresh rate, relatively low energy consumption and convenience to carry. The present application overcomes the problems of high driving voltage of dots, long response time, low refresh rate, large dot pitch of Braille, high energy consumption, inconvenience to carry and the like in the prior art.

Therefore, the present application can be widely applied to digitally and dynamically presenting single-row or multi-rows of Braille and dot-matrix touch images, has the characteristics of real time, stability and high cost performance to help visually impaired people open a novel field of "vision" to enjoy a good life and harmoniously integrate into the information society.

BRIEF DESCRIPTION OF THE DRAWINGS

In order to describe the embodiments of the present application or the technical scheme in the prior art more clearly, brief introduction on drawings needed to be used in the embodiment will be made below. It is obvious that the drawings described below are some embodiments of the present application, and those skilled in the technical field further can obtain other drawings according to the structures illustrated by the drawings without creative efforts.

REFERENCE NUMBERS IN THE DRAWINGS

Figure 1:
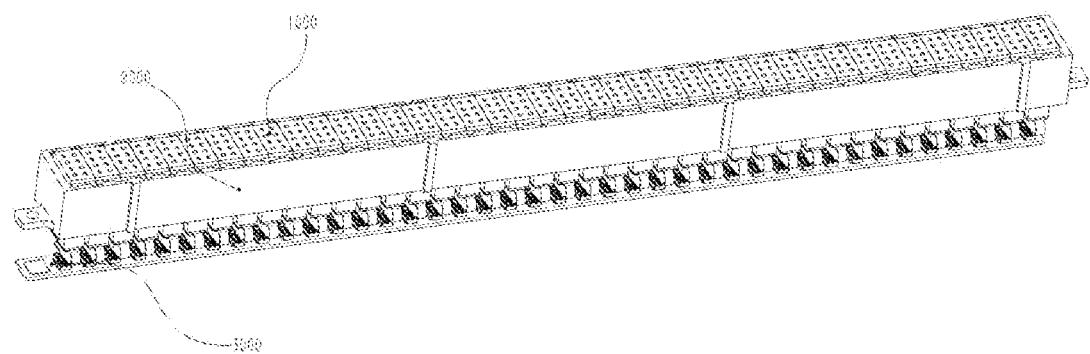
FIG. 1 is an exploded view of an overall structure of an embodiment of the present application.

10—outer shell;
20—control system;
30—Braille display module;
40—shell;
50—bottom plate;
60—main circuit board;
70—vision module;
80—voice module;
90—button module;
100—radiating module;
110—tactile module;
120—display screen;
130—loudspeaker;
140—audio adjusting electric knob;
150—functional button;
160—fan system;
170—radiating fin;
180—Braille display device;
401—upper end surface of shell;
4011—pattern of outer shell;
4012—functional button hole;
4013—display screen hole;
4014—touch boss hole;
402—right surface of shell;
4021—power connecting hole;
4022—earphone hole;
4023—volume adjusting rotary knob hole;
4024—power switch hole;
4025—air outlet grid;
403—left surface of shell;
4031—program burning hole;
4032—USB plug hole;
4033—loudspeaker hole;
4034—air inlet grid;
404—inner cavity of shell;
4041—bottom plate mounting column;
4042—main circuit board mounting column;
4043—display screen limiting groove;
4044—display screen mounting hole;
4045—loudspeaker fixing groove;
4046—Braille display device fixing column;
4047—fan fixing groove;
501—shell mounting hole;
502—Braille display device fixing hole;
503—bottom radiating grid;
504—foot pad;
601—front surface of main circuit board;
6011—main circuit board mounting hole;
6012—circuit board limiting groove;
6013—cabling base of display screen;
6014—power switch interface;
602—reverse surface of main circuit board;
6021—power interface;
6022—cabling base of Braille display device;
6023—Darlington transistor;
6024—latch;
6025—master control chip;
6026—memory chip;
6027—voice synthesis chip;
6028—program burning interface;
6029—USB interface;
60210—interface of air inlet fan;
60211—loudspeaker interface;
60212—up key interface;
60213—return key interface;
60214—bookmark key interface;
60215—Braille type switch key interface;
60216—enter key interface;
60217—down key interface;
60218—interface of air outlet fan;
60219—power line interface of Braille display device;
60220—cables of Braille display device;
1201—screen of display screen;
1202—connecting wire of display screen;
1301—connecting wire of loudspeaker;
1302—volume adjusting knob;
1303—audio interface;
1501—up key;
1502—return key;
1503—bookmark key;
1504—Braille type switch key;
1505—enter key;
1506—down key;
1507—power switch key;
1601—connecting wire of air inlet fan;
1602—air inlet fan;
1603—air outlet fan;
1604—connecting wire of air outlet fan;
1701—mounting hole;
1801—Braille dot;
1802—touch boss;
1803—fixing hole in upper end surface;
1804—power line interface;
1805—cable interface;
1806—fixing hole in lower end surface;
1807—radiating fin mounting hole.

DETAILED DESCRIPTION

Embodiments of the present application will be described in detail below, and examples of all the embodiments are shown in the drawings. The embodiments described with reference to the drawings below are exemplary, and are merely used for explaining the present application and are not construed as limitation to the present application.

In the description of the present disclosure, it is to be understood that the terms "central", "longitudinal", "transverse", "length", "width", "thickness", "upper", "lower", "front", "back", "left", "right", "vertical", "horizontal", "top", "bottom", "inner", "outer", etc. indicate azimuthal or positional relations on the basis of those shown in the drawings only for ease of description of the present disclosure and for simplicity of description, and are not intended to indicate or imply that the referenced device or element must have a particular orientation and be constructed and operative in a particular orientation, and thus may not be construed as a limitation on the present application.

In addition, terms "first" and "second" are merely used for descriptive purposes and cannot be construed as indicating or implying relative importance or implicitly specifying the number of indicated technical features. Thus, features defining "first", "second" and the like can expressively or implicitly include at least one feature. In the description of the present application, unless otherwise specified, "a plurality of" means at least two, for example, two, three and the like.

In the present application, unless otherwise specified and defined, the terms such as "mount", "connect", "connection" and "fix" shall be understood in a board sensor. For example, it can be either fixed connection or detachable connection or integrated connection; either mechanical connection or electrical connection or communication with each other; either direct connection or indirect connection through an intermediate, and communication in two components or interaction relaxation of the two components, unless otherwise specified. Those of ordinary skill in the art can understand specific meaning of the terms in the present application under specific circumstances.

As shown in FIG. 1-14, an embodiment of a Braille module and a dot-matrix tactile display terminal of the present application is provided. In the embodiment, a Braille module includes a touch pad module 1100, Braille dot driver modules 1200, magnetic conductive plates 1300, an enclosure panel 1400, a bottom plate 1500, a bottom plate accessory 1600 and a needle stand connector module 1700, wherein the touch pad module 1100 is provided with eight-dot array Braille dots arranged in two rows and four columns, and each of the Braille dots is controlled by one Braille dot driver module 1200.

In the embodiment, both sides of the touch pad module 1100 are provided with two buckles 1113, and the two buckles 1113 and two chutes 1401 in the enclosure panel 1400 are in clearance fit;
  a lower bottom surface of the touch pad module 1100 contacts with a positioning plate platform 1405 on the enclosure panel 1400;
  a positioning hole 1131 of the touch pad module 1100 is in a reversed trumpet shape for positioning an upper iron core 1210 in the Braille dot driver module 1200;
  the magnetic conductive plates 1300 are arranged in three grooved magnetic conductive plate grooves 1402 of the enclosure panel 1400 and are made from an iron base amorphous alloy;
  the bottom of the enclosure panel 1400 is provided with two bottom plate slots 1404, and the enclosure panel and two enclosure panel slots 1501 of the bottom plate 1500 are in clearance fit for mounting the enclosure panel 1400 on the bottom plate 1500;
  the bottom plate 1500 is provided with sixteen pin column holes 1502 for clearance fit with pin columns 1243 of the Braille dot driver module 1200 for fixing the Braille dot driver module 1200;
  the bottom plate accessory 1600 is provided with two connecting columns 1601 for transition fit with bottom plate accessory connecting holes 1503 of the bottom plate 1500; and
  a lower part of the bottom plate accessory 1600 is provided with the needle stand connector 1700, the needle stand connector 1700 is provided with a lead pin locking base 1720 for transition fit with a lead pin 1260 of the Braille dot driver module 1200.

In the embodiment, the touch pad module 1100 includes a touch pad 1110, Braille touch dots 1120 and a positioning plate 1130, wherein the bottom of the touch pad 1110 is provided with five positioning plate connecting holes 1112 for transition fit with five connecting columns 1132 of the positioning plate 1130;
  the diameter of eight holes above the positioning plate 1130 is smaller than that of the lower end of each Braille touch dot 1120;
  a cavity is formed between a step hole 1111 of the touch pad 1110 and an upper top surface of the positioning plate 1130 for providing a moving space for the Braille touch dots 1120 to move up and down;
  the touch pad 1110 and the positioning plate 1130 are made from nylon and are injection-molded by a precise mold; and
  the Braille dots 1120 are made from an aluminum alloy.

In the embodiment, the Braille dot driver module 1200 includes an upper iron core 1210, a drive needle 1220, a coil 1230, a framework 1240, a permanent magnet 1250 and a lead pin 1260;
  the permanent magnet 1250 is arranged at the bottom of the step hole of the framework 1240;
  the upper iron core 1210 is provided with a through hole, is mounted in the step hole of the framework 1240 for clearance fit, is adhered and attached to a top surface of the framework 1240 and is made from a soft magnetic material of DT4C model, and the size of a cone-shaped head of the upper iron core 1210 is smaller than that of the positioning hole 1131 of the positioning hole 1130;
  the drive needle 1220 is inserted into the through hole of the upper iron core 1210, and a lower end surface of the drive needle tightly contacts with a top surface of the permanent magnet 1250;
  the coil 1230 is wound by a 80-micron enameled wire and is arranged on a wrapping post 1241 of the framework 1240, and a coil-in and a coil-out of the coil bypass two lead grooves 1240 of the framework 1240 and are welded with two lead pins 1260;
  the framework 1240 is made from glass fiber reinforced nylon and is injection-molded by the precision mold, and two lead pins 1260 are inserted onto two pin columns 1243 thereof, and
  the two lead pins 1260 are made from iron or copper and are inserted onto two pin columns 1243 of the framework 1240 after the upper ends of the lead pins 1260 are roughened, and the lower ends of the lead pins 1260 are inserted into the lead pin locking base 1720 of the bottom plate accessory 1600.

After a reverse current is applied to the lead pins 1260 of the Braille dot driver module 1200, under the joint action of the coil 1230 and the upper iron core 1210, a forward magnetic field and a reverse magnetic field are generated to drive the permanent magnet 1250 to move upwards or downwards; when the permanent magnet 1250 moves upwards, it drives the drive needle 1220 to move upwards, and when the permanent magnet 1250 clings to the bottom surface of the upper iron core 1210, the drive needle 1220 is at an upper dead point; when the permanent magnet 1250 moves downwards, the drive needle 1220 moves downwards dependent on its own gravity. When the permanent magnet 1250 contacts with the step plane of the step hole in the framework 1240, the drive needle 1220 is at a lower dead point.

In the embodiment, the enclosure panel 1400 is concave, is made from nylon and is injection-molded by the precision mold; tops on both sides of the enclosure panel 1400 are provided with two chutes 1401 with bevels; and two lower sides of the chutes 1401 protrude inwards to form the positioning plate platform 1405;

the touch pad module 1100 is fixed by the chutes 1401 and the positioning plate platform 1405;

the bottom of the positioning plate platform 1405 is provided with three pairs of magnetic conductive plate grooves 1402 for placing the magnetic conductive plates 1300; and the enclosure panel 1400 is provided with four positioning columns 1403 for transition fit with an assembly slot 2004 in a base 2000, and the bottom of the enclosure panel 1400 is provided with two bottom plate slots 1404 for being connected to an enclosure panel slot 1501 of the bottom plate 1500.

In the embodiment, the bottom plate 1500 is made from a soft magnetic material of DT4C model, is provided with circular slot type enclosure panel slots 1501 and pin column holes 1502 for mounting eight Braille dot driver modules 1200; and the eight Braille dot driver modules 1200 are mounted on the bottom plate 1500, and a bottom surface of a square platform of the framework 1240 contacts with a top surface of the bottom plate 1500 for fixing the framework 1240.

When the permanent magnet 1250 contacts with the step plane of the step hole in the framework 1240, the permanent magnet 1250 can be attracted by the bottom plate 1500 below the framework 1240 under the magnetic action.

In the embodiment, the bottom plate accessory 1600 is cuboid-shaped, is made from nylon and is injection-molded by the precise mold; and there are two cylindrical columns 1601 at the top left corner and the bottom right corner for being connected to the bottom plate 1500;

the bottom plate accessory 1600 is internally provided with eight groups of sixteen trumpet-shaped through holes 1602, and arrangement sizes of the through holes are identical to those of the bottom plate 1500 and the needle stand connector module 1700; and the bottom plate accessory 1600 is configured to guide the lead pins 1260 of the Braille dot driver module 1200 to the lead pin locking base 1720 of the needle stand connector module 1700.

In the embodiment, the needle stand connector module 1700 includes a connector base 1710, the lead pin locking base 1720, a flexible flat cable 1730 and a male connector 1740 of the connector;

the connector base 1710 is provided with eight groups of diagonally distributed step holes for clearance fit with the lead pin locking base 1720; and one end of the flexible flat cable 1730 is welded with the lead pin locking base 1720 and the other end thereof is connected to the male connector 1740 of the connector.

A dot-matrix tactile display terminal includes at least one Braille module 1000 and a base 2000, wherein the Braille module 1000 is the Braille module 1000 according to any one of claims 1-8; the Braille module 1000 is provided with a positioning column 1403, and the positioning column 1403 and an assembly slot 2004 on the base 2000 are in transition fit, so that the Braille module 1000 is stably connected to the base 2000; and the dot-matrix tactile display terminal is configured to digitally and dynamically present single-row or multi-rows of Braille and dot-matrix touch images.

In the embodiment, the base 2000 is of a cuboid frame structure, and thin bosses at both ends of the base 2000 are provided with connecting holes 2001;

four positioning bosses 2002 are uniformly arranged in front of the base 2000, four positioning grooves 2003 are uniformly formed behind the base 2000, and the positioning bosses 2002 and the positioning grooves 2003 are adaptive for positioning a plurality of bases 2000 expanded in parallel; and an inner wall of each base 2000 is provided with several groups of assembly slots 2004 for fixing the Braille modules 1000.

FIG. 1 is a schematic diagram of a single-row dot-matrix tactile display terminal with 40 Braille modules in the embodiment of the present application. As shown in FIG. 1, as an optional embodiment, the present application provides a dot-matrix tactile display terminal and a Braille module. The terminal is formed by combining several Braille modules 1000 and a base 2000 for digitally and dynamically presenting single-row or multi-rows of Braille and dot-matrix touch images. FIG. 1 presents a single-row dot-matrix tactile display terminal formed by 40 Braille modules 1000 and a base 2000.

Figure 2:
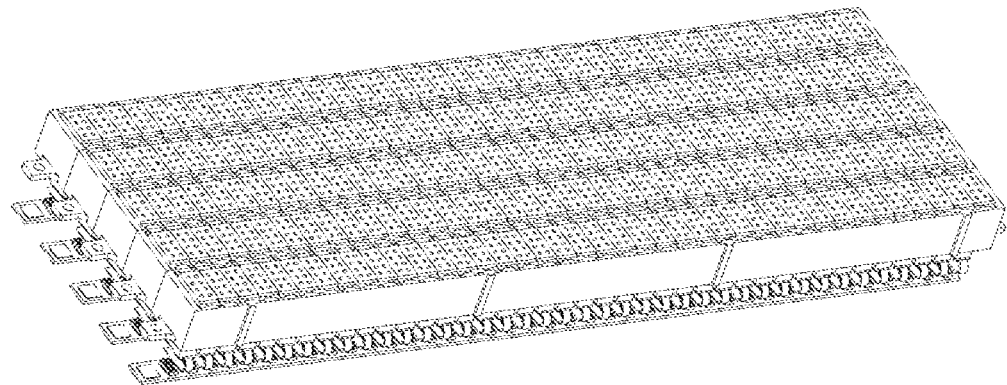
FIG. 2 is a front schematic diagram of an embodiment of the present application.

FIG. 2 is a schematic diagram of a multi-row dot-matrix tactile display terminal with 4 rows in the embodiment of the present application. As shown in FIG. 2, as an optional embodiment, multiple rows of Braille presented digitally and dynamically are originated from the multi-row dot-matrix tactile display terminal which is formed by arranging and combining several single-row dot-matrix tactile display terminals in parallel. Dot-matrix touch images presented digitally and dynamically are originated from the multi-row dot-matrix tactile display terminal which is formed by arranging and combining several single-row dot-matrix tactile display terminals in parallel, wherein the number of rows is not less than three. FIG. 2 presents the multi-row dot-matrix tactile display terminal formed by splicing four rows of single-row dot-matrix tactile display terminals, which can present multiple rows of Braille and two-dimensional dot-matrix touch images.

Figure 3:
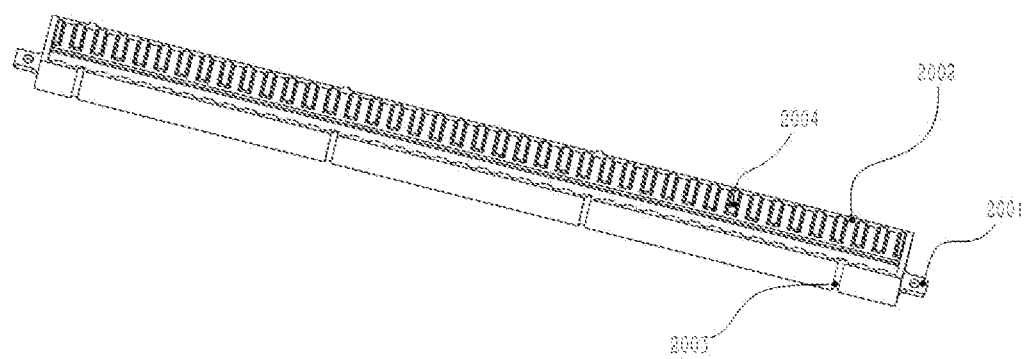
FIG. 3 is a rear schematic diagram of an embodiment of the present application.

FIG. 3 is a structural schematic diagram of the base in the embodiment of the present application. As shown in FIG. 3, as an optional embodiment, the base 2000 is of the cuboid frame structure, and thin bosses at both ends of the base 2000 are provided with connecting holes 2001 for fixing the base 2000 to an external connector. Four positioning bosses 2002 and four positioning grooves 2003 are uniformly formed in front of and behind the base 2000 for positioning a plurality of bases 2000 expanded in parallel. The inner wall of each base 2000 is provided with 40 pairs of assembly slots 2004 for fixing the Braille modules 1000.

Figure 4:
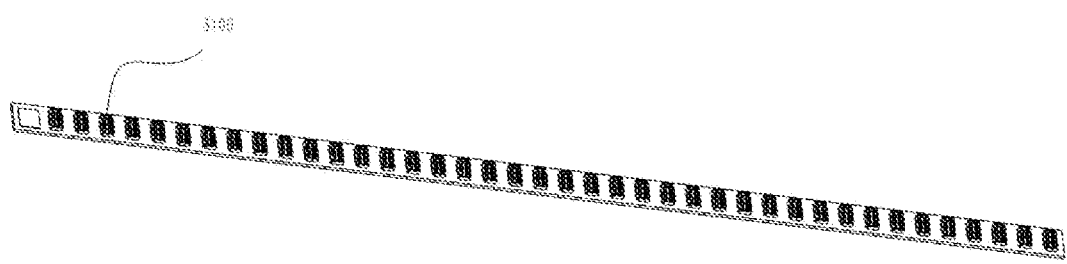
FIG. 4 is an internal structural schematic diagram of an embodiment of the present application.

FIG. 4 is a structural schematic diagram of a control circuit board in the embodiment of the present application. As shown in FIG. 4, as an optional embodiment, 40 connector receptacles 3100 are arranged on the control circuit board and can be paired with the male connectors of the connector 1740 on the flexible flat cable 1730 under the Braille module 1000.

Figure 5:
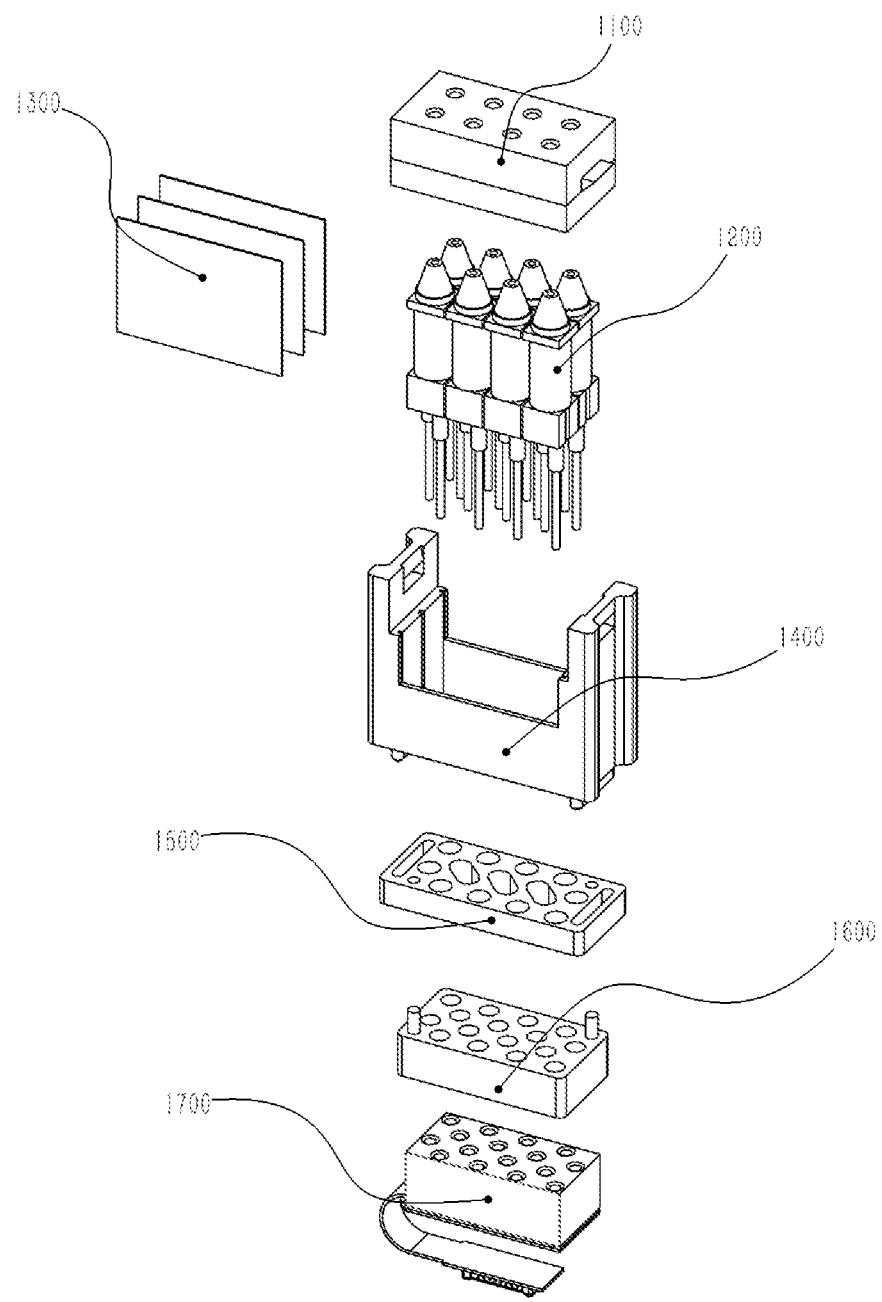
FIG. 5 is a front schematic diagram of a shell in an embodiment of the present application.

FIG. 5 is the exploded view of the Braille module in the embodiment of the present application. As shown in FIG. 5, as an optional embodiment, the Braille module 1000 includes the touch pad module 1100, the Braille dot driver modules 1200, the magnetic conductive plates 1300, the enclosure panel 1400, the bottom plate 1500, the bottom plate accessory 1600 and the needle stand connector module 1700, wherein the Braille module has eight dot matrix Braille dots arranged in two rows and four columns. The Braille module 1000 is provided with the positioning column 1403 in transition fit with the assembly slot 2004 in the base 2000, so that the Braille module 1000 is stably connected to the base 2000. Motion of each Braille dot is independently controlled by one Braille dot driver module 1200. Both sides of the touch pad module 1100 are provided with two buckles 1113, and the two buckles and two chutes 1401 in the enclosure panel 1400 are in clearance fit. The lower bottom surface of the touch pad module 1100 contacts with the positioning plate platform 1405 on the enclosure panel 1400. The positioning hole 1131 of the touch pad module 1100 is in a reversed trumpet shape for positioning an upper iron core 1210 in the Braille dot driver module 1200. The magnetic conductive plates 1300 are placed in three grooved magnetic conductive plate grooves 1402 of the enclosure panel 1400 and are made from an iron base amorphous alloy. The saturation magnetic induction Bs is 1.56 T, and the thickness is 0.026 mm. The magnetic conductive plates are used for eliminating magnetic interference among the Braille dot driver modules. The bottom of the enclosure panel 1400 is provided with two bottom plate slots 1404 in clearance fit with two enclosure panel slots 1501 of the bottom plate 1500, so that the enclosure panel 1400 is mounted on the bottom plate 1500.

Further, the bottom plate 1500 is provided with sixteen pin column holes 1502 for clearance fit with pin columns 1243 of the Braille dot driver module 1200 for fixing the Braille dot driver module 1200. The bottom plate accessory 1600 is provided with two connecting columns 1601 for transition fit with bottom plate accessory connecting holes 1503 of the bottom plate 1500. The lower part of the bottom plate accessory 1600 is provided with the needle stand connector 1700, the needle stand connector 1700 is provided with the lead pin locking base 1720 for locking the lead pin 1260 of the Braille dot driver module 1200.

Figure 6:
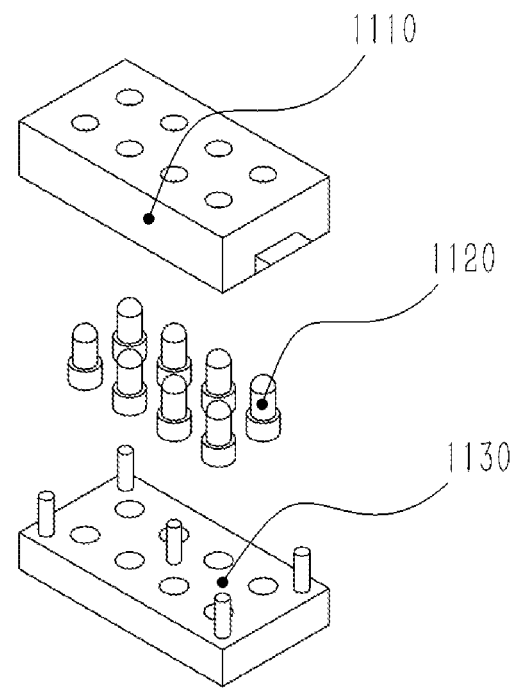
FIG. 6 is a rear schematic diagram of the shell in an embodiment of the present application.

FIG. 6 is the exploded view of the touch pad module in the embodiment of the present application. As shown in FIG. 6, as an optional embodiment, the touch pad module 1100 includes the touch pad 1110, the Braille touch dots 1120 and the positioning plate 1130, wherein the bottom of the touch pad 1110 is provided with five positioning plate connecting holes 1112 for transition fit with five connecting columns 1132 on the front side of the positioning plate. The eight Braille dots 1120 can move up and down independently in the cavity formed in the middle of the upper top surfaces of the eight step holes 1113 of the touch pad 1110 and the positioning plate 1130. The diameter of eight holes above the positioning plate is smaller than that of the bottom surface of the Braille touch dot 1120.

Figure 7:
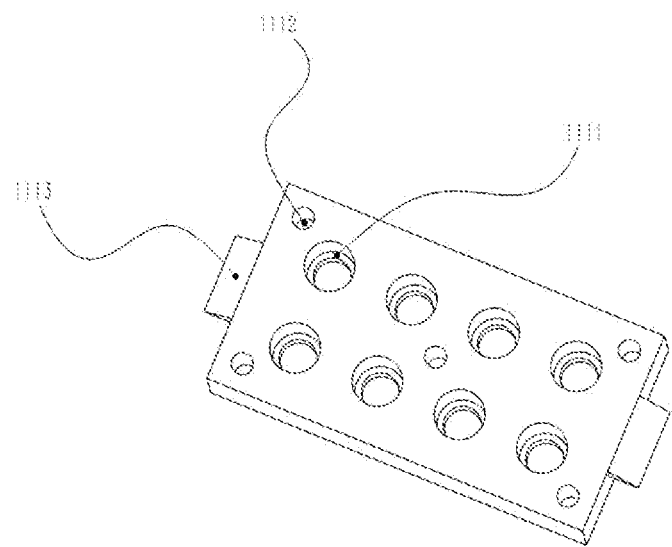
FIG. 7 is a structural schematic diagram of a front surface of a main circuit board in an embodiment of the present application.

FIG. 7 is a schematic structural diagram of the touch pad in the embodiment of the present application. As shown in FIG. 7, as an optional embodiment, the touch pad module 1100 includes the touch pad 1110, the Braille touch dots 1120 and the positioning plate 1130, wherein the bottom of the touch pad 1110 is provided with five positioning plate connecting holes 1112 for transition fit with five connecting columns 1132 on the front side of the positioning plate.

Figure 8:
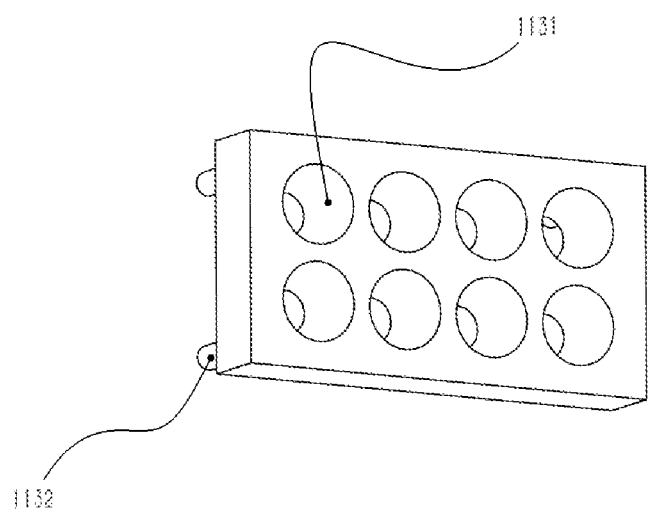
FIG. 8 is a structural schematic diagram of a reverse surface of a main circuit board in an embodiment of the present application.

FIG. 8 is a schematic structural diagram of the positioning plate in the embodiment of the present application. As shown in FIG. 8, as an optional embodiment, the diameter of eight holes above the positioning plate 1130 is smaller than that of the lower end of the Braille touch dot 1120. The cavity is formed between the step hole 1111 of the touch pad 1110 and the positioning plate 1130, thereby providing a movable space where the Braille dot 1120 moves up and down. The touch pad 1110 and the positioning plate 1130 are made from nylon and are injection-molded by a precise mold. The Braille dots 1120 are made from an aluminum alloy and are machined by a CNC precision automatic lathe.

Figure 9:
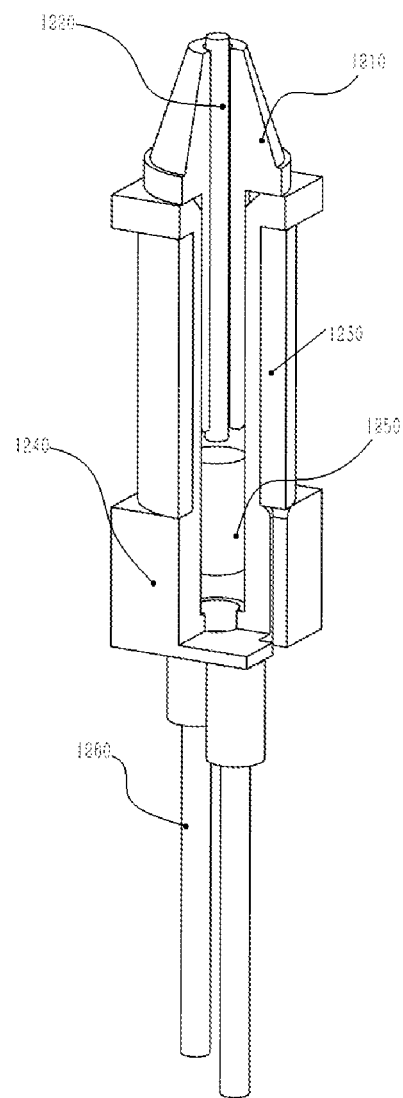
FIG. 9 is a schematic structural diagram of a screen of a display screen in an embodiment of the present application.

FIG. 9 is the structural schematic diagram of the Braille dot driver module in the embodiment of the present application. As shown in FIG. 9, as an optional embodiment, the Braille dot driver module 1200 includes the upper iron core 1210, the drive needle 1220, the coil 1230, the framework 1240, the permanent magnet 1250 and the lead pin 1260. The permanent magnet 1250 is arranged at the bottom of the step hole of the framework 1240. The upper iron core 1210 is provided with the through hole, is inserted into the step hole of the framework 1240, is adhered and attached to a top surface of the framework 1240, is made from a soft magnetic material of DT4C model, and is machined by the CNC precision automatic lathe. Blackening rust-proof treatment is needed. The size of the cone-shaped head of the upper iron core 1210 is slightly smaller than that of the positioning hole 1131 of the positioning hole 1130. The drive needle 1220 is inserted into the through hole of the upper iron core 1210, and the lower end surface thereof tightly contacts with the top surface of the permanent magnet 1250. The coil 1230 is wound by a 0.08 mm enameled wire and is wrapped on the wrapping post 1241 of the framework 1240, and the coil-in and the coil-out of the coil bypass two lead grooves 1240 of the framework 1240 and are welded with two lead pins 1260.

Further, after a reverse current is applied to the lead pins 1260 of the Braille dot driver module 1200, under the joint action of the coil 1230 and the upper iron core 1210, a forward magnetic field and a reverse magnetic field are generated to drive the permanent magnet 1250 to move upwards or downwards. When the permanent magnet 1250 moves upwards, it drives the drive needle 1220 to move upwards, and when the permanent magnet 1250 clings to the bottom surface of the upper iron core 1210, the drive needle 1220 is at the upper dead point. When the permanent magnet 1250 moves downwards, the drive needle 1220 moves downwards dependent on its own gravity. When the permanent magnet 1250 contacts with the step plane of the step hole in the framework 1240, the drive needle 1220 is at the lower dead point.

Figure 10:
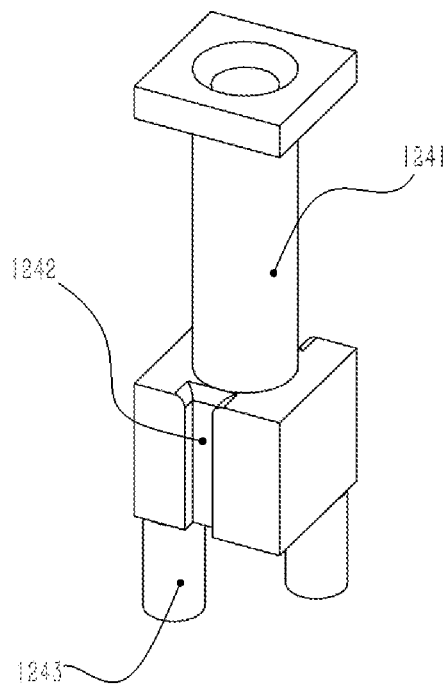
FIG. 10 is a structural schematic diagram of a connecting wire of a display screen in an embodiment of the present application.

FIG. 10 is the structural schematic diagram of a framework of the Braille dot driver module in the embodiment of the present application. As shown in FIG. 10, as an optional embodiment, the framework 1240 is made from glass fiber reinforced nylon and is injection-molded by the precision mold, and two lead pins 1260 are inserted onto two pin columns 1243 thereof. The two lead pins 1260 are made from iron or copper. The longer lead pin 1260 is a positive pole interface of the power supply, and the shorter lead pin 1260 is a negative pole interface of the power supply. The lead pins 1260 are inserted onto two pin columns 1243 of the framework 1240 after the upper ends of the lead pins are roughened, and the depth is not less than 1.5 mm. The lower ends of the lead pins 1260 are inserted into the lead pin locking base 1720 of the bottom plate accessory 1600, and the depth is not less than 2.5 mm.

Figure 11:
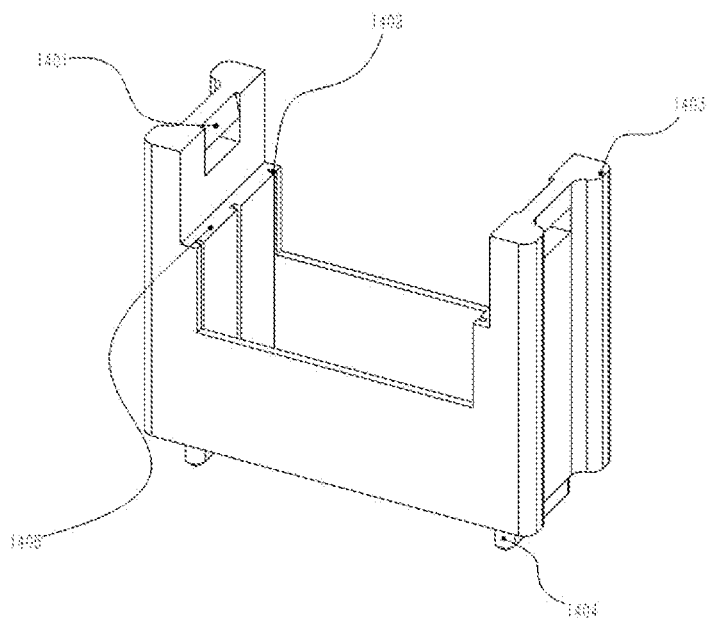
FIG. 11 is a schematic structural diagram of a loudspeaker of a control system in an embodiment of the present application.

FIG. 11 is the structural schematic diagram of the enclosure panel of the Braille dot driver module in the embodiment of the present application. As shown in FIG. 11, as an optional embodiment, the enclosure panel 1400 is concave, is made from nylon and is injection-molded by the precision mold; tops on both sides of the enclosure panel 1400 are provided with two chutes 1401 with bevels; and two lower sides of the chutes 1401 protrude inwards to form the positioning plate platform 1405. The touch pad module 1100 is fixed by the chutes 1401 and the positioning plate platform 1405. The bottom of the positioning plate platform 1405 is provided with three pairs of magnetic conductive plate grooves 1402 for placing the magnetic conductive plates 1300. There are totally four positioning columns 1403 at the most peripheries of both sides of the enclosure panel 1400, the positioning columns 1403 and the assembly slots 2004 in a base 2000 form transition fit, and the bottom of the enclosure panel 1400 is provided with two circular groove type bosses, which are bottom plate slots 1404 for being connected to an enclosure panel slot of the bottom plate 1500.

Figure 12:
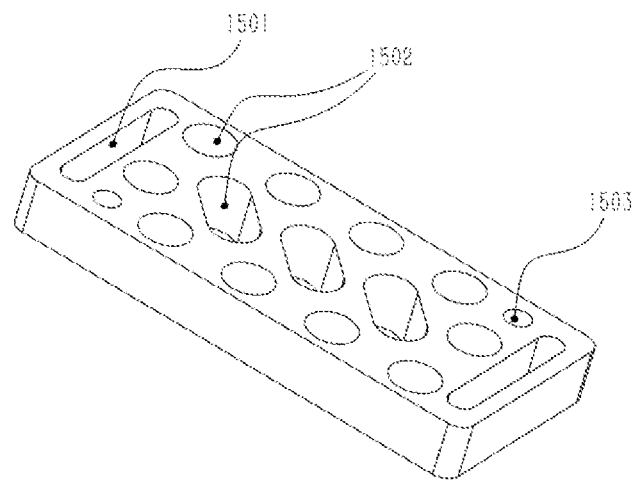
FIG. 12 is a structural schematic diagram of functional buttons of the control system in an embodiment of the present application.

FIG. 12 is the structural schematic diagram of the bottom plate of the Braille dot driver module in the embodiment of the present application. As shown in FIG. 12, as an optional embodiment, the bottom plate 1500 is made from the soft magnetic material with DT4C model. The bottom plate needs to be subjected to paint spraying for insulating and rust-preventing treatments. Both ends of the bottom plate 1500 are provided with circular groove type enclosure panel slots 1501. Two bottom plate accessory connecting holes are totally formed in the top left corner and the bottom right corner of the bottom plate, and ten round through holes and three circular groove type through holes are formed in the middle, which are called pin column holes 1502. The pin column holes in the top left corner and the bottom right corner are in pair, totally 8 groups. The eight Braille dot driver modules 1200 are mounted. The middle circular groove type through hole is shared by two adjacent pin columns. The eight Braille dot driver modules 1200 are mounted on the bottom plate 1500, and the bottom surface of the square platform of the framework 1240 contacts with the top surface of the bottom plate 1500 for fixing the framework 1240. When the permanent magnet 1250 contacts with the step plane of the step hole in the framework 1240, the permanent magnet 1250 can be attracted by the bottom plate 1500 below the framework 1240 under the magnetic action.

Further, the bottom plate accessory 1600 is made from a nylon material and is injection-molded by the precision mold. The main body of the bottom plate accessory is cuboid-shaped, and there are two cylindrical columns at the top left corner and the bottom right corner for being connected to the bottom plate 1500. The bottom plate accessory is internally provided with 8 groups of 16 through holes in trumpet shape. The through holes are big on the upper side and small on the lower side. The arrangement interval and positions of the holes are kept consistent with those of the bottom plate 1500 and the needle stand connector module 1700. The bottom plate accessory 1600 is fixed at the bottom of the bottom plate 1500 to guide the lead pins 1260 of the Braille dot driver module 1200 to the lead pin locking base 1720 of the needle stand connector module.

Figure 13:
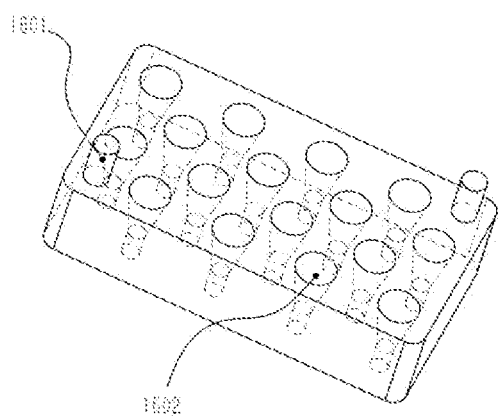
FIG. 13 is a schematic structural diagram of a Braille display device with Braille display modules in an embodiment of the present application.

FIG. 13 is the structural schematic diagram of the bottom plate accessory of the Braille dot driver module in the embodiment of the present application. As shown in FIG. 13, as an optional embodiment, the bottom plate accessory 1600 is cuboid-shaped, is made from nylon and is injection-molded by the precise mold; and there are two cylindrical columns 1601 at the top left corner and the bottom right corner for being connected to the bottom plate 1500. The bottom plate accessory 1600 is internally provided with totally 8 groups of 16 trumpet-shaped through holes 1602. The arrangement interval and positions of the holes are identical to those of the bottom plate 1500 and the needle stand connector module 1700. The bottom plate accessory 1600 guides the lead pins 1260 of the Braille dot driver module 1200 to the lead pin locking base 1720 of the needle stand connector module 1700.

Figure 14:
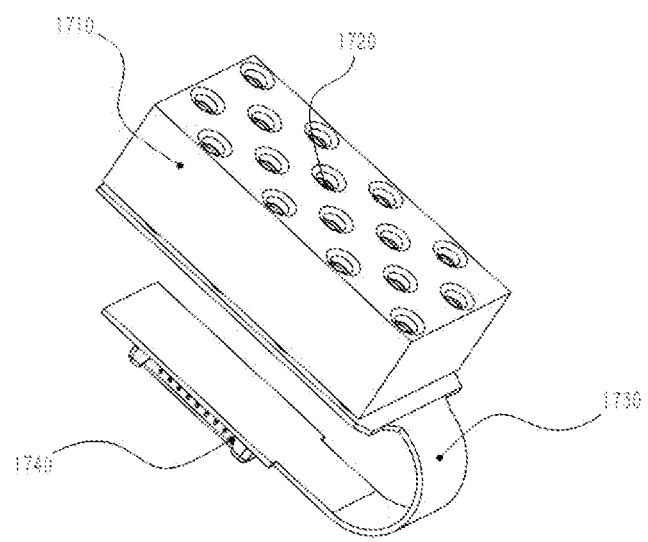
FIG. 14 is a structural schematic diagram of a connecting wire of a power line interface of the Braille display module in an embodiment of the present application.

FIG. 14 is the structural schematic diagram of the needle stand connector module in the embodiment of the present application. As shown in FIG. 14, as an optional embodiment, the needle stand connector module 1700 includes the connector base 1710, the lead pin locking base 1720, the flexible flat cable 1730 and the male connector 1740 of the connector. The connector base 1710 is provided with eight groups of diagonally distributed step holes, and the lead pin locking base 1720 is in clearance fit with the step holes. One end of the flexible flat cable 1730 is welded with the bottoms of eight pairs of sixteen lead pin locking bases 1720 and the other end thereof is connected to the male connector 1740 of the connector.

The technical features of the above embodiments may be combined freely. In order to describe briefly, the description is not made on all possible combinations of the technical features of the embodiments. However, the combinations of these technical features should be considered as a scope of the specification as long as there is no contradiction.

The above embodiments only express several embodiments of the present application, are described in more detail, but are not to be construed as a limitation to the scope of the applied patent. It is to be noted that several variations and modifications may also be made by those skilled in the art without departing from the spirit of the present application, which all fall within the protection scope of the present application. Therefore, the protection scope of the patent of the present application shall be subjected to the appended claims.

What is claimed is:

1. A Braille module, comprising:
   a touch pad module;
   Braille dot driver modules;
   magnetic conductive plates;
   an enclosure panel;
   a bottom plate;
   a bottom plate accessory; and
   a needle stand connector module,
   wherein the touch pad module is provided with eight-dot array Braille dots arranged in two rows and four columns, and each of the Braille dots is controlled by one Braille dot driver module.

2. The Braille module according to claim 1, wherein both sides of the touch pad module are provided with two buckles, and the two buckles and two chutes in the enclosure panel are in clearance fit;
   a lower bottom surface of the touch pad module contacts with a positioning plate platform on the enclosure panel;
   a positioning hole of the touch pad module is in a reversed trumpet shape for positioning an upper iron core in the Braille dot driver module;
   the magnetic conductive plates are arranged in three grooved magnetic conductive plate grooves of the enclosure panel and are made from an iron base amorphous alloy;
   the bottom of the enclosure panel is provided with two bottom plate slots, and the enclosure panel and two enclosure panel slots of the bottom plate are in clearance fit for mounting the enclosure panel on the bottom plate;

the bottom plate is provided with sixteen lead pin column holes for clearance fit with pin columns of the Braille dot driver module for fixing the Braille dot driver module;

the bottom plate accessory is provided with two connecting columns for transition fit with bottom plate accessory connecting holes of the bottom plate; and a lower part of the bottom plate accessory is provided with the needle stand connector, the needle stand connector is provided with a lead pin locking base for transition fit with a lead pin of the Braille dot driver module.

3. The Braille module according to claim 1, wherein the touch pad module comprises a touch pad, Braille touch spots and a positioning plate, wherein the bottom of the touch pad is provided with five positioning plate connecting holes for transition fit with five connecting columns of the positioning plate;

the diameter of eight holes above the positioning plate is smaller than that of the lower end of each Braille touch dot;

a cavity is formed between a step hole of the touch pad and an upper top surface of the positioning plate for providing a moving space for the Braille touch dots to move up and down; and the touch pad and the positioning plate are made from nylon and are injection-molded by a precise mold.

4. The Braille module according to claim 3, wherein the Braille dot driver module comprises an upper iron core, a drive needle, a coil, a framework, a permanent magnet and a lead pin;

the permanent magnet is arranged at the bottom of the step hole of the framework;

the upper iron core is provided with a through hole, is mounted in the step hole of the framework for clearance fit, and is adhered and attached to a top surface of the framework, and the size of a cone-shaped head of the upper iron core is smaller than that of the positioning hole of the positioning hole;

the drive needle is inserted into the through hole of the upper iron core, and a lower end surface of the drive needle tightly contacts with a top surface of the permanent magnet;

the coil is wound by an enameled wire and is arranged on a wrapping post of the framework, and a coil-in and a coil-out of the coil bypass two lead grooves of the framework and are welded with two lead pins;

the framework is injection-molded by the precision mold, and two lead pins are inserted onto two pin columns thereof, and the two lead pins are inserted onto two pin columns of the framework, and lower ends of the lead pins are inserted into the lead pin locking base of the bottom plate accessory.

5. The Braille module according to claim 4, wherein the enclosure panel is concave, is made from nylon and is injection-molded by the precision mold;

tops on both sides of the enclosure panel are provided with two chutes with bevels, and two lower sides of the chutes protrude inwards to form the positioning plate platform;

the touch pad module is fixed by the chutes and the positioning plate platform;

the bottom of the positioning plate platform is provided with magnetic conductive plate grooves for placing the magnetic conductive plates; and the enclosure panel is provided with four positioning columns for transition fit with an assembly slot in a base, and the bottom of the enclosure panel is provided with two bottom plate slots for being connected to an enclosure panel slot of the bottom plate.

6. The Braille module according to claim 5, wherein the bottom plate is provided with circular slot type enclosure panel slots and pin column holes for mounting eight Braille dot driver modules; and the eight Braille dot driver modules are mounted on the bottom plate, and a bottom surface of a square platform of the framework contacts with a surface of the bottom plate for fixing the framework.

7. The Braille module according to claim 6, wherein the bottom plate accessory is cuboid-shaped, is made from nylon and is injection-molded by the precise mold, and there are two cylindrical columns at the top left corner and the bottom right corner for being connected to the bottom plate;

the bottom plate accessory is internally provided with eight groups of sixteen trumpet-shaped through holes, and arrangement sizes of the through holes are identical to those of the bottom plate and the needle stand connector module; and the bottom plate accessory is configured to guide the lead pins of the Braille dot driver module to the lead pin locking base of the needle stand connector module.

8. The Braille module according to claim 7, wherein the needle stand connector module comprises a connector base, the lead pin locking base, a flexible flat cable and a male connector of the connector;

the connector base is provided with eight groups of diagonally distributed step holes for clearance fit with the lead pin locking base; and one end of the flexible flat cable is welded with the lead pin locking base and the other end thereof is connected to the male connector of the connector.

9. A dot-matrix tactile display terminal, comprising:
a plurality of Braille modules; and
a base,
wherein each Braille module comprises:
a touch pad module;
Braille dot driver modules;
magnetic conductive plates;
an enclosure panel;
a bottom plate;
a bottom plate accessory; and
a needle stand connector module,
wherein the touch pad module is provided with eight-dot array Braille dots arranged in two rows and four columns, and each of the Braille dots is controlled by one Braille dot driver module;
wherein each Braille module is provided with a positioning column, and the positioning column and an assembly slot on the base are in transition fit; and
wherein the dot-matrix tactile display terminal is configured to digitally and dynamically present single-row or multi-rows of Braille and dot-matrix touch images.

10. The dot-matrix tactile display terminal according to claim 9, wherein the base is of a cuboid frame structure, and thin bosses at both ends of the base are provided with connecting holes;

four positioning bosses are uniformly arranged in front of the base, four positioning grooves are uniformly formed behind the base, and the positioning bosses and the positioning grooves are adaptive for positioning a plurality of bases expanded in parallel; and an inner wall of each base is provided with several groups of assembly slots for fixing the Braille modules.

* * * * *